United States Patent
El-Sherif et al.

(10) Patent No.: US 6,299,104 B1
(45) Date of Patent: Oct. 9, 2001

(54) METHOD AND APPARATUS FOR EVALUATING PARACHUTES UNDER LOAD

(75) Inventors: Mahmoud A. El-Sherif; Dina M. El-Sherif, both of Narbeth, PA (US); Calvin K. Lee, Needham, MA (US)

(73) Assignee: Photonics Laboratories, Inc., Narberth, PA (US)

( * ) Notice: Subject to any disclaimer, the term of this patent is extended or adjusted under 35 U.S.C. 154(b) by 0 days.

(21) Appl. No.: 09/631,541

(22) Filed: Aug. 3, 2000

(51) Int. Cl.[7] .................................................. B64D 17/00
(52) U.S. Cl. ................. 244/142; 244/137.3; 73/838; 73/794; 73/812; 340/946; 340/665
(58) Field of Search ................. 244/142, 137.1, 244/137.3; 73/838, 794, 812, 795; 340/946, 665

(56) References Cited

U.S. PATENT DOCUMENTS

| | | | |
|---|---|---|---|
| 3,698,667 | * 10/1972 | Studenick et al. | 244/32 |
| 4,420,755 | * 12/1983 | Primbs, Jr. | 340/870.38 |
| 4,429,580 | * 2/1984 | Testa et al. | 73/768 |
| 6,070,832 | * 6/2000 | Redd | 244/137.3 |

* cited by examiner

Primary Examiner—J. Woodrow Eldred
(74) Attorney, Agent, or Firm—John S. Munday

(57) ABSTRACT

A system and method for evaluating flexible structures such as textiles under load generally. A specific embodiment is shown for parachutes. A plurality of first sensors and second sensors are attached to the parachute on its canopy and suspension lines. Preferred first sensors are fiber Bragg gratings (FBG) type sensors, and preferred second sensors are modal power distribution (MPD) type sensors. A fiber optic network interconnects the pluralities of first and second sensors to provide sensor outputs which are converted to electronic signals, modulated and transmitted to a receiving station for receiving and processing the transmitted modulated electronic signals. The preferred fiber optic network includes a plurality of light emitting diodes positioned at one end of each fibers and a photodiode array positioned to receive light from each of the fibers. The transmitter acquires the output as data, processes and RF modulates the signal to enhance the signal to noise ratio and prepares it for wireless transmission. The signal may be recorded or read-out before modulation. The preferred receiving station demodulates the received signal enhances the output signal before read-out or recording.

36 Claims, 6 Drawing Sheets

METHOD AND APPARATUS FOR EVALUATING PARACHUTES UNDER LOAD

FIELD OF THE INVENTION

This invention relates to a method and apparatus for evaluating strain and stress in textiles and flexible materials under strain. More particularly, the invention relates to the use of fiber optics technology with high speed data transmission and acquisition devices to provide a novel remote sensory evaluation system, such as for parachutes during deployment and Inflation.

BACKGROUND OF THE INVENTION

For any parachute system, it is important to predict the opening forces it will experience in order to make a safe and economic choice of materials to be used. Only limited data for these decisions is available and any numerical model sought to be used is also limited by the lack of data to use and to verify the model. Novel techniques are therefore needed to determine the structural behavior of a parachute during inflation. A different method for experimental measurement of parachute behavior during opening is also needed. There are other fabrics and textiles that are subjected to stress, such as, for example, balloons and the like.

The schematic of the standard quasi-static circular canopy parachute is shown in FIG. 1. This parachute comprises two main parts: the canopy and the suspension lines. A parachute drop generally consists of three principal stages: deployment, inflation, and descent. The deployment phase begins with the ejection of the payload from the aircraft, rocket or the like, and ends when the suspension lines and folded canopy have been fully extracted from the deployment bag. The full extension of the parachute system is marked by the "snatch" force impulse, an acquisition event that occurs when the falling payload accelerates the parachute mass up to its own velocity.

In most military airdrops, the deployment bag is attached to the aircraft by a static tether; hence, the time lag between payload ejection and the snatch point is usually small. In free-fall personnel drops and sport parachute jumps, the time delay is usually longer. In either case, the parachute shape at the end of the deployment phase is essentially that of an elongated but deflated tube. During the subsequent inflation phase, the elongated parachute transforms from a closed tube to an open canopy, ultimately increasing the aerodynamic drag and decelerating the payload. Eventually, a steady-state condition or descent is reached where the aerodynamic drag balances gravity and the payload drifts to earth at a relatively constant velocity.

A typical plot of the force on the payload versus time during parachute opening is shown in FIG. 2. As this figure indicates, the force on the payload, with the exception of the snatch impulse is small during the initial stages of inflation. As the inflation continues, the opening force exerted by the continually filling canopy increases to a peak, then decreases over time.

In the design of parachute systems, therefore, it is very important to use structural properties that have been developed under the representative force rates expected in flights. Without such data, the designer is potentially forced to incorporate unrealistic safety margins, resulting in a parachute that is heavier and costlier than necessary. Laboratory test data has generally been limited to that which can be acquired at quasi-steady strain rates. Past work has suggested that the properties of textile materials obtained through the typical quai-static testing process are inapplicable to dynamic strain conditions.

Past reported work presents the use of electronic strain gauge equipment for measuring stresses under various loading conditions. Testing materials at representative high strain rates of dynamic forces requires much more sophisticated equipment than found in a typical material testing laboratory.

It would be a great advantage in the art to have an improved methodology and apparatus, which takes advantage improved data acquistion techniques, such as that of advances in fiber optic sensors for fabrics, textiles and other flexible structures.

Still another advantage would be to use fiber optics technology to determine the stress/strain relation of flexible devices such as parachutes during deployment and inflation.

It is therefore an object of this invention to provide a method and apparatus for high speed data acquisition devices as well as electronic RF (radio frequency) transmitter receivers are used for signal processing and transmission of the information to a ground station.

Another object is to provide a method and apparatus using fiber optics technology to evaluate parachutes under load.

Yet another object is to obtain a means of determining the dynamic properties of structural materials in-situ and in real-time.

Other objects will appear hereinafter.

SUMMARY OF THE INVENTION

It has now been discovered that the above and other objects of the present invention may be accomplished in the following manner. The unique aspect of this invention is the use of advances in fiber optic sensors. This fiber optic sensory system provides a means of determining the dynamic properties of structural materials in-situ and in real-time. The developed invented testing methodology uses fiber optics technology to determine the stress/strain relation of parachutes during deployment and inflation as one example of in-situ real-time material evaluation. In addition, high speed data acquisition devices as well as electronic RF (radio frequency) transmitter receivers are used for signal processing and transmission of the information to a ground station.

This methodology and the apparatus therefore provide the novel remote sensory system of the present invention for use with a parachute. Parachutes include a canopy, a plurality of suspension lines attached thereto at one end and, of course, a load attached to the suspension lines at the other end therof. The term load is intended to cover parachutists and inanimate payloads such as packages of supplies and the like. The present invention is intended for use with all types and varieties of parachutes used for any purpose.

A plurality of first sensors are attached to the canopy and/or the suspension lines for measuring localized axial strain and stress measurements. Preferred are fiber Bragg gratings (FBG) type sensors. In addition, a plurality of second sensors are attached to the canopy and/or the suspension lines and are, preferably, modal power distribution (MPD) type sensors. Both sensor types are provided with a light source, such as a light emitting diode, to transmit light along the axis of the Bragg fiber for the FBG type sensors or the multimode optical fiber for the MPD type sensors. At the other end of the sensor is a light receiving device, such as one or an array of photodetectors, forming a fiber optic network interconnecting the sensors to provide sensor outputs. Of course, deployment of the sensor system and processing elements is intended for use with any flexible structure under strain, using the concepts of this invention as disclosed herein.

The sensor outputs are received by a transmitter, converted to electronic signals, modulated and transmitted to a receiving station for receiving and processing the data. The data then allows the user to evaluate the forces on the parachute (or other fabric) with respect to the particular load used, the conditions of deployment, and the like.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
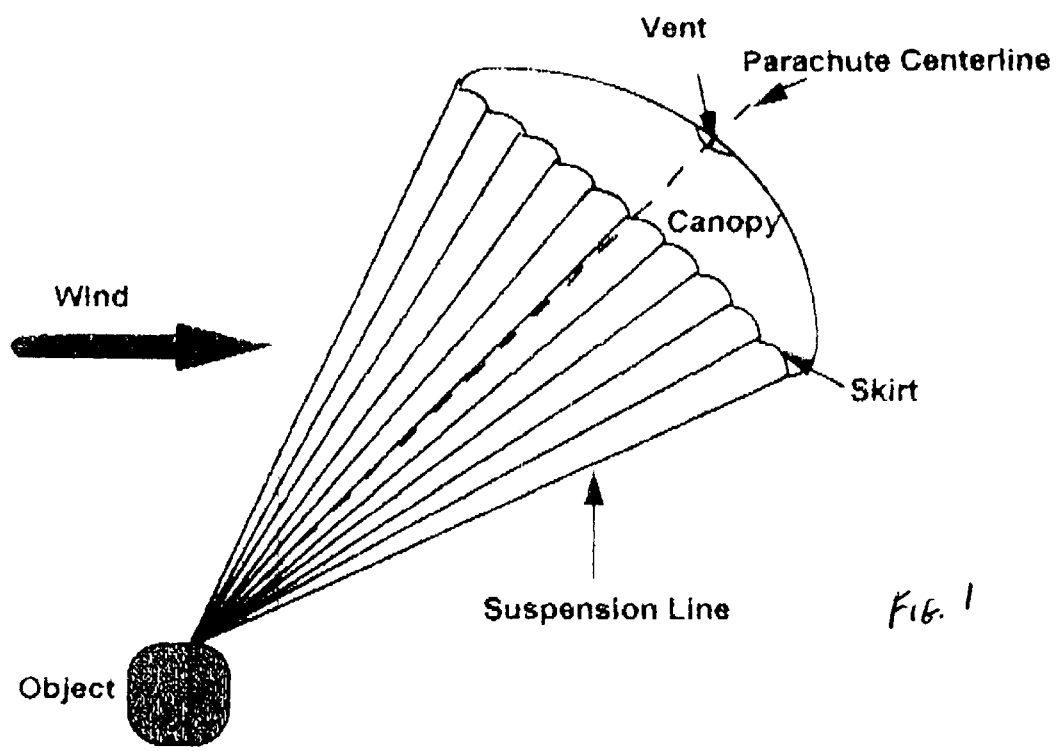
FIG. 1 is a schematic diagram of a deployed conventional circular canopy parachute carrying a load.
Figure 2:
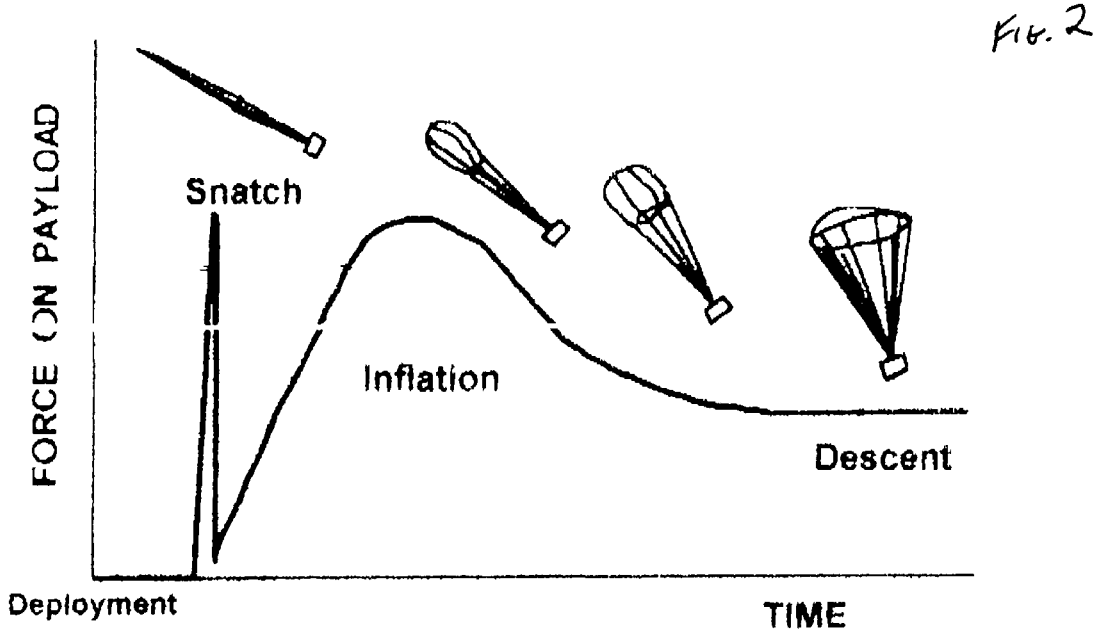
FIG. 2 is a graph illustrating payload force versus time for a typical circular parachute drop.
Figure 3:
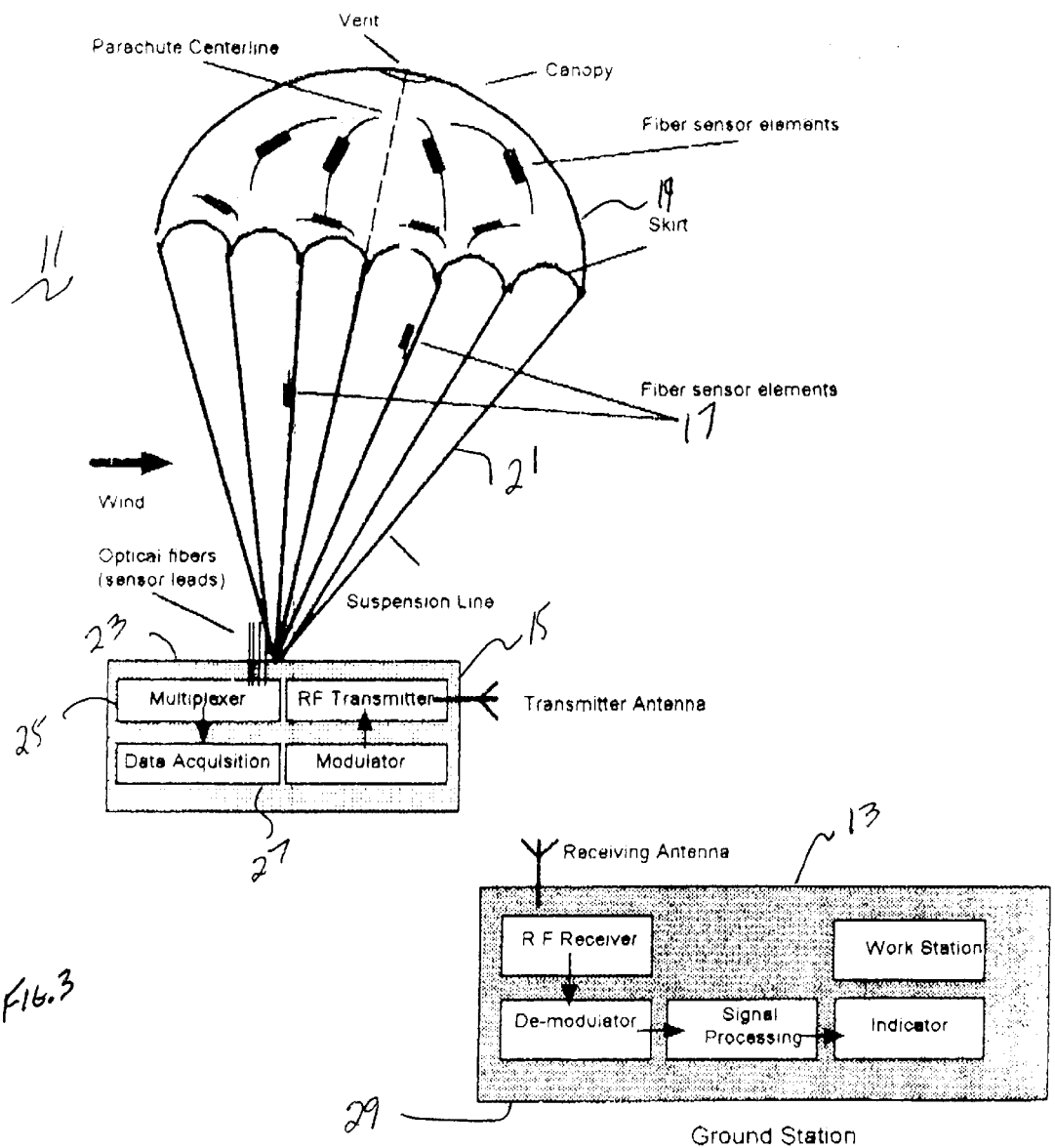
FIG. 3 is a schematic diagram of a circular parachute with the invented remote optical fiber system and the ground station.

The present invention is a novel testing system that is established, in-situ, to permit monitoring of critical parameters of flexible structures, such as during parachute deployment and inflation in real-time. The fiber optic remote sensory system of this invention is shown in FIG. 3, where the preferred embodiment is illustrated. While the following description uses a parachute deployment as the preferred embodiment, it is to be understood that other uses to measure strain in other flexible materials is part of this invention as well. The system comprises a number of fiber optic sensors positioned at different locations in the canopy and suspension lines. A plurality of first sensors are made of fiber bragg gratings (FBG) type sensors and a plurality of second sensors are made of modal power distribution (MPD) type sensors. The first or FBG sensors are used for the localized axial strain and stress measurements, and the second or MPD sensors are used for transverse stress measurements as well as integration of axial stress/strain for large areas.

These sensors are interconnected using a fiber optic network. The sensor output is transferred to electronic signals that is modulated and transmitted to a ground station. At the receiving ground station, the sensor output is demodulated and displayed through a signal processing unit. This invention discloses the development of a fiber optic system for remote sensing of dynamic strain induced in textile structures in real-time. FIG. 3 is a schematic diagram of a circular parachute 11 with the remote optical fiber system and the ground station 13 which receives a transmitted signal from transmitter 15. As can be seen, sensors 17, described in greater detail below, are embedded in the canopy 19 and suspension lines 21 of parachute 11. Sensor outputs 23 enter multiplexer 25 to provide data acquistion in converter 27, which converts the outputs to RF signals which are sent to the ground station 29. At the ground station 29, the RF signal is received, demodulated, processed, and used as desired to evaluate the action of the parachute under load.

As noted above, sensors 17 actually comprise pluralities of first and second sensors. One of the two is a measures localized axial strain and measurements and the other makes transverse stress measurements and integration of axial stress/strain measurements for large areas. It is the combination of two sets of data that allows a complete evaluation of the action of the parachute under load in accordance with the present invention.

I. Modal Power Distribution (MPD) Technique and Sensor

The MPD technique is used with multimode optical fibers for real-time characterization of the textile structures. In order to monitor the state of the material, the variation of the modal power within multimode optical fibers in response to external loads is used. The light in multimode optical fibers propagates in a finite number of guided modes forming a set modal patterns. In the presence of an external load applied to a multimode optical fiber, the boundary conditions at the core-cladding interface will change. Changing the boundary conditions will lead to a redistribution of the modal power. This redistribution will be detected at the fiber output. The modal power redistribution (MPR) measurements will lead to the information on the external disturbance applied to the embedded fiber. By scanning the far-field pattern at the fiber end using a CCD camera or array of photodetectors, the measurements of the distribution and subsequent redistribution of the modal power can be continuously recorded and used as an indication of the applied loads.

Figure 4:
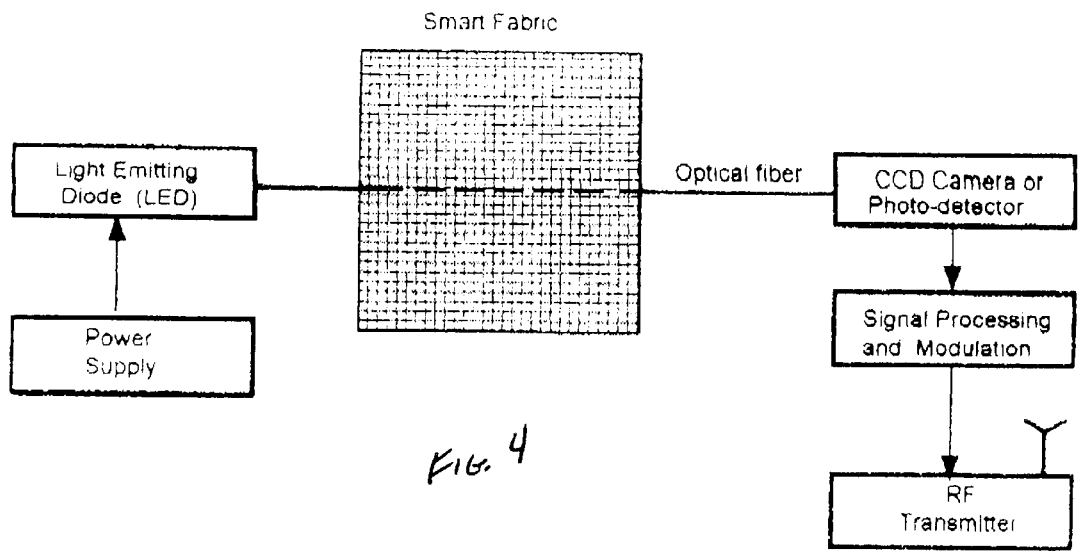
FIG. 4 is a sample of a single unit sensor used for testing stress/strain in the parachute fabric based on the MPD technique.
Figure 5:
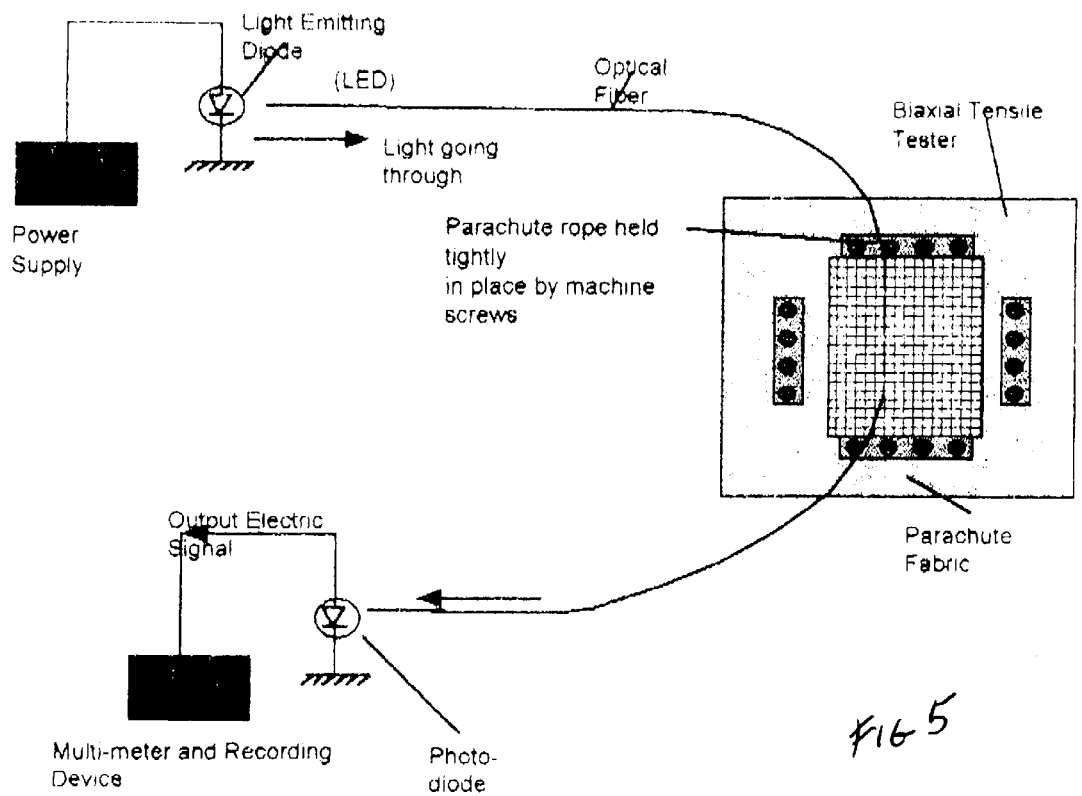
FIG. 5 is a schematic set-up of fabric testing with a Photo-detector.

In order to evaluate this sensor concept, a strand of optical fiber was stitched and embedded along a square piece of nylon fabric. This nylon fabric was mounted on the Biaxial Tensile Tester, shown in FIG. 5. The schematic test set-up for MPD measurements is shown in FIG. 4. The optical fiber was then connected to a light emitting diode (LED) from one end and a CCD camera at the other. The switches on the control panel of the biaxial tensile tester allow you to pull the fabric in two directions. You can pull in an X-direction or in a Y-direction, or even both. The fabric being tested had the optical fiber running along the X-direction and pulling was performed along the Y-direction only or in both. The control panels display the amount of displacement occurring in the fabric along with the load in kilograms pulling the fabric.

Figure 6:
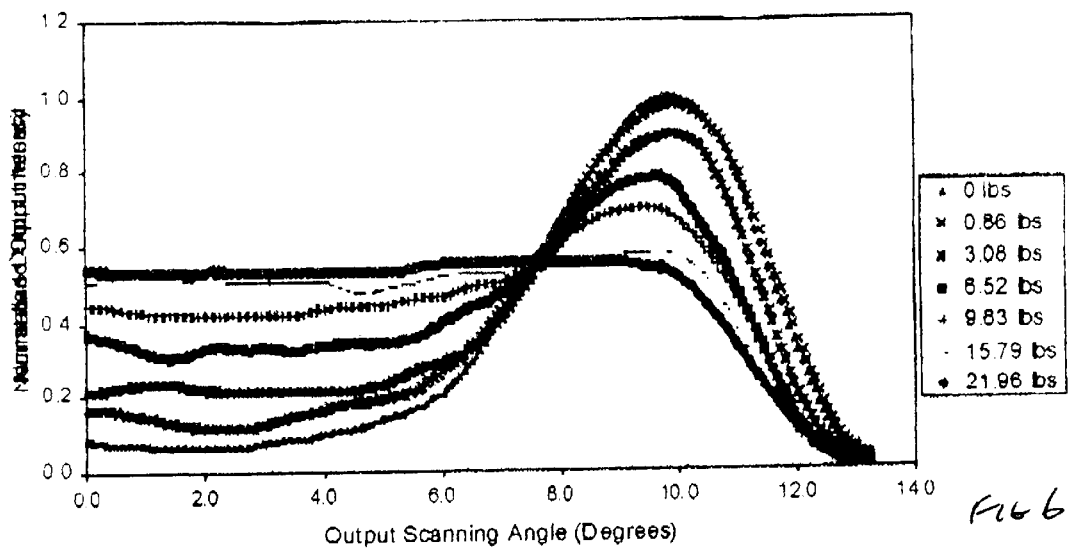
FIG. 6 illustrates the normalized output intensity versus output scanning angle for different transverse axial loads.

The test was carried out in a uniform systematic way. The tensile tester would pull the fabric a certain amount, then the result (the ring) was captured and saved, then the next reading was taken. Several readings were taken for loading and unloading the fabric. The images were finally smoothed and the profiles of the results were plotted on Excel, as shown in FIG. 6. These profiles present the light intensity distribution taken at a line passing through the center of the fare field pattern. Each curve represents the light intensity profile at a certain loading condition. Based on the results obtained, a photo-detector was used to correlate the optical signals to applied loads. Since using a CCD camera for real-time measurements within the parachute is not realistic, the CCD camera was replaced by a photo-detector. In this case the test set-up was modified to a simple and sensitive set-up.

Figure 7:
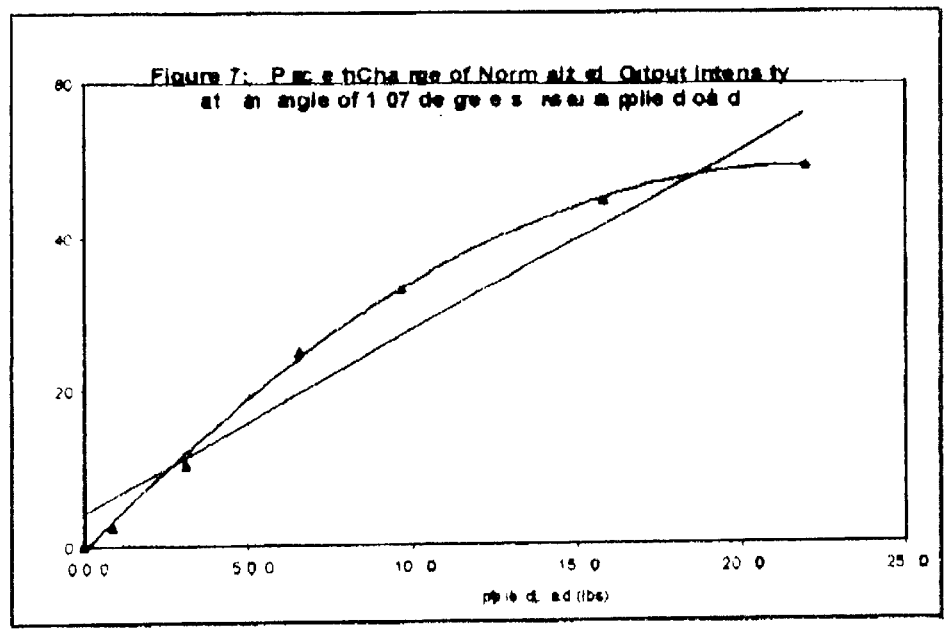
FIG. 7 illustrates the percent change of normalized output intensity versus applied load.

Another experimental set-up was used that is very similar to that used in the fabric testing methodology used with the CCD camera. It has the same set-up as before, except that the fiber is connected directly to a photo-detector rather than to the CCD (charged coupled device) camera. The fabric is held tightly in place by the grips of the biaxal tensile tester. One end of the fiber is placed in front of the light emitting diode (LED) while the other end of the optical fiber is placed directly in front of the photodetector. Both the LED and the photo-detector are placed at the end faces of the optical fibers at a small angle off the fiber axis. This angle is adjusted to satisfy the conditions required for applying the Modal Power Distribution (MPD) Technique. The power supply is needed to give out the required current to the LED coupled into the single strand of optical fiber. The photo-detector collects the optical signals through an electronic circuit to a multi-meter for read-out and records the sensor output signal. The light intensity versus applied loads is presented in FIG. 7. This figure presents the relation between stresses applied to this textile fabric and sensor output.

There are several reasons for replacing the CCD camera with a photo-detector. Planning for the actual experimental set-up for real-time characterization of the parachute during inflation time requires looking for special types of components and devices that can satisfy the needs for the parachute airdrop test. This application requires that the equipment and components used are very rigid and light and also small in size.

Figure 8:
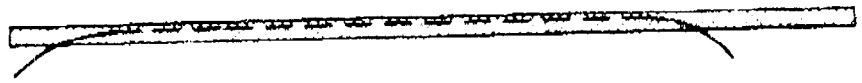
FIG. 8 illustrates an optical fiber stitched on the surface of a rope.
Figure 9:
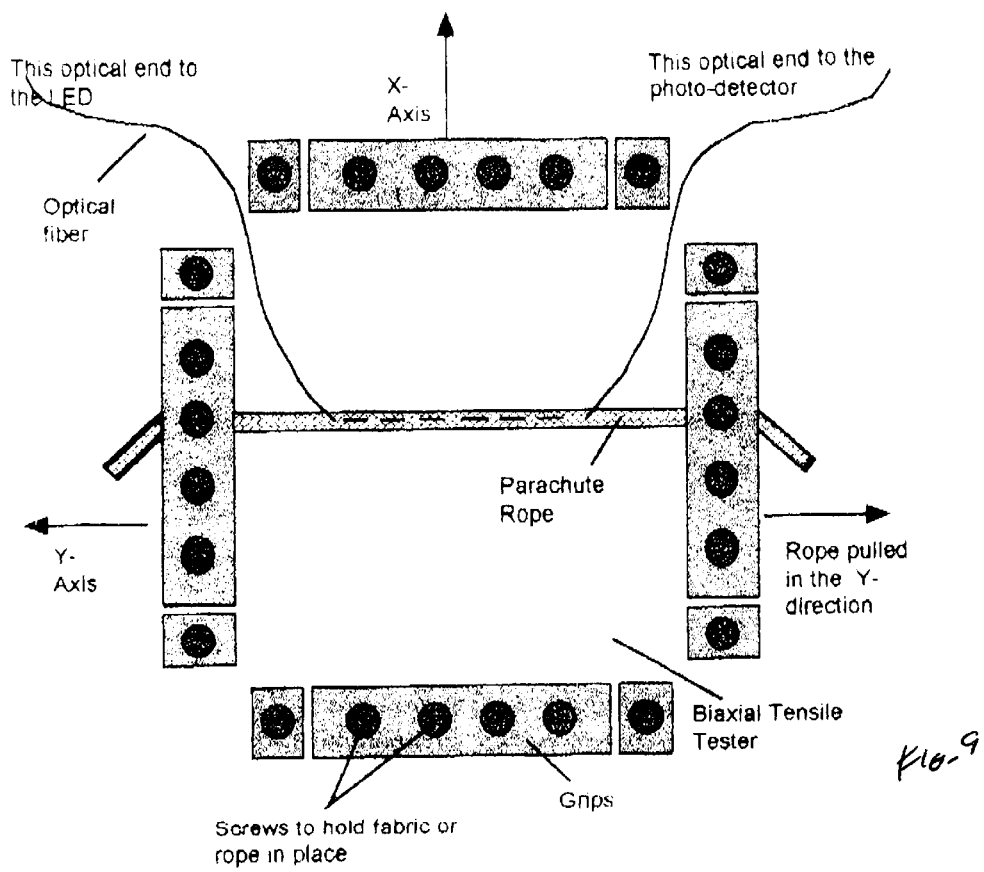
FIG. 9 shows a schematic diagram of a parachute rope gripped by the tensile tester.

Experiments were also performed on rope material used for the parachute suspension lines. The rope had the optical fiber stitched along its length. The suspension rope had the fiber stitched on its surface in a straight line parallel to the rope axis, shown in FIG. 8. The optical fiber was stitched only in the center part of the rope for approximately 4 inches. Therefore, the two ends of the sample of the parachute rope (about 4 inches) were free from the optical fiber. This method of stitching was used to insure the fiber's protection against damage when the rope was placed into the biaxial tensile tester. However, other stitching or weaving techniques can be used and the length of the fiber can match the length of the rope. The experimental set-up is identical to the set-up used for the fabric as shown in FIG. 4. Here, the parachute rope was placed along the longitudinal (Y) axis of the biaxal machine. Each end of the rope (which has no fiber stitched into it) is wrapped around one of the center pins along the Y-axis of the machine. FIG. 9 is a drawing of this illustration. One end of the fiber was placed close to the CCD camera while the other was placed off axis to the LED. The image displayed on the monitor connected to the CCD camera indicated that the fiber did not have a lot of residual stress induced on it, and that it can maintain a large dynamic range and reasonable sensitivity. Once again the CCD camera was replaced by a photo-detector. The photo-detector will satisfy the requirements for real-time air drop tests for lightweight and small size as mentioned before for testing the parachute fabric. This test set-up was very similar to that of the test performed before on the fabric. Again, the LED couples the light in the optical fiber and the multi-meter records the output electric signal of the detector. Again, very nice accurate uniform relationships were developed correlating axial forces (or strain) applied to the rope to the sensor output.

II. Fiber Bragg Gratings Technique and Sensor

Figure 10:
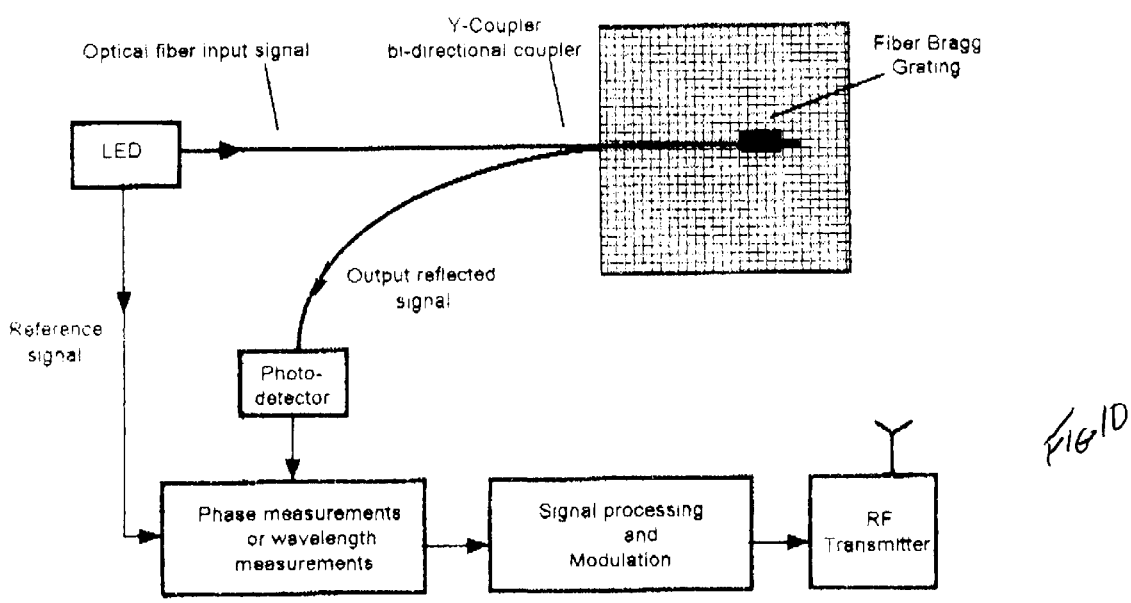
FIG. 10 illustrates a sample of a single unit sensor used for testing stress/strain in the fabric or suspension lines based on FBG technique.

In these experiments, a canopy fabric was tested. The experimental set-up of the tensile test is shown in FIG. 10. The grating region of the optical Bragg grating fiber was bonded on the surface of the canopy textile material sample and located at its central part. This sample integrating the optical Bragg grating fiber was placed in the biaxial tensile tester. As has been mentioned before, this machine is equipped with electro-mechical force and displacement measurements.

Therefore, when the sample is subjected to an amount of load and displacement, it can easily be calibrated.

The initial Bragg reflection wavelength of the fiber Bragg grating used is 1299.97 nm (when the optical Bragg grating fiber is not subjected to any perturbation or disturbance). This value is measured at room temperature The optical and geometrical properties of the used optical Bragg grating fiber are:

Full width at half-maximum: line-width equal to 0.17 nm.

Initial reflectivity at the Brag reflection wavelength is equal to 97.7% (−12.76 dB).

Grating length is 10 mm.

It should be noted that any other fiber Brag grating can be used. The optical light source is a broadband Light Emitting Diode with a central wavelength of about 1300 nm and a full bandwidth at half-maximum equal to 65 nm. The Y optical fiber coupler is a bidirectional coupler. The phase or wavelength measurements are accomplished by using interferometer or optical spectrum analyzer, respectively.

Figure 11:
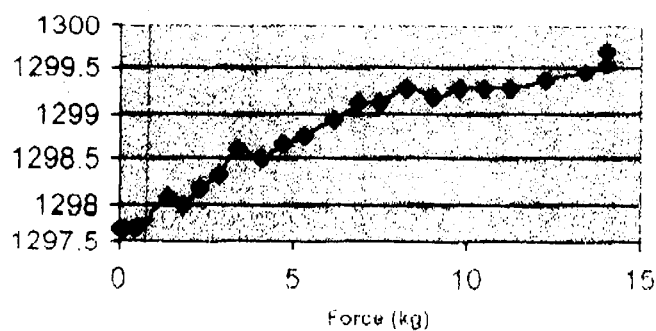
FIG. 11 illustrates the Bragg wavelength versus applied load.
Figure 12:
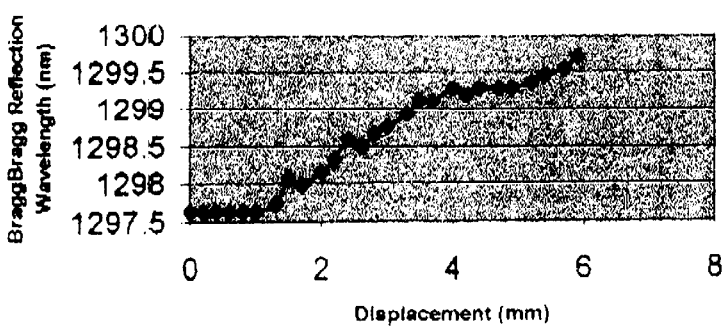
FIG. 12 illustrates wavelength shift versus induced displacement.

The tests have been performed several times for the same sample under loading and unloading operations. The results reveal good correlation for all tests and good reproducibility of the sensor's response. A sample of the results is shown in FIGS. 11 and 12. FIG. 11 presents the Bragg wavelength (measured) versus applied load. This load was applied to the textile fabric. The induced strain in the fabric is transferred to the optical fibers resulting in wavelength shift of Bragg conditions. The wavelength shift versus the induced displacement (strain) in the fabric is shown in FIG. 12.

III. System Integration

The integration of a number of sensors from each type forms the sensory components of the system of this invention. The orientation of these fiber sensors is designed to match with the line and direction of forces in both the canopy fabric and the suspension lines. However, other orientation directions may be considered. In this way, the stress/strain field can be detected and continuously measured everywhere in the textile structure. As a result, the stress/strain field in the structure can be monitored in real-time. Dynamic forces can be continuously measured in-situ in real-time.

The output of these optical sensors will be collected in a central unit and transferred to electronic signals. Data acquisition, signal processing and RF modulation will be performed to enhance the signal to noise ratio and signal preparation for wireless transmission. The signal can be recorded or read-out before modulation. The wireless transmission is developed for real-time measurements of dynamic forces during airdrop. A wireless RF transmitter is used to transmit the information to the ground receiver. The received signal will be demodulated and signal processing will be performed to enhance the output signal before read-out or recording as indicated in FIG. 3. Samples of the sensory system components were integrated into a parachute canopy fabrics and suspension lines for testing and proving the invention concept. Successful results were obtained from static and dynamic testing.

As can be seen, the purpose of this invention, to develop the methodology required for stress/strain measurements of a parachute canopy and suspension lines under deployment and inflation dynamics in-situ and in real-time, has been accomplished. Discrete point sensing as well as distributed sensing methods were used. Sensor embeddment into parachute canopy fabrics as well as in suspension lines were investigated, ultimately culminating in the integration of the fiber sensors into textile fabrics and fiber architecture.

While particular embodiments of the present invention have been illustrated and described, it is not intended to limit the invention to any specific embodiment. The essence of this invention is the use of a plurality of fiber optic sensors embedded in textile as well as flexible structures for health monitoring and in-situ measurements of stress/strains in real-time. The description of the invention is not intended to limit the invention, except as defined by the following claims.

What is claimed is:

1. A system for evaluating parachutes under load, comprising:
   a parachute including a canopy, a plurality of suspension lines attached thereto at one end and a load attached to said suspension lines at the other end therof,
   a plurality of first sensors attached to said canopy and said suspension lines for measuring localized axial strain and stress measurements;
   a plurality of second sensors attached to said canopy and said suspension lines for transverse stress measurements and as integration of axial stress/strain measurements for large areas;
   a fiber optic network interconnecting said pluralities of first and second sensors to provide sensor outputs;
   a transmitter for receiving said sensor outputs, converting said outputs to electronic signals, modulating said electronic signals and transmitting said modulated electronic signals; and
   a receiving station for receiving and processing said transmitted modulated electronic signals.
   The system of claim 1, wherein said plurality of first sensors are fiber bragg gratings (FBG) type sensors.

2. The system of claim 1, wherein said plurality of second sensors are modal power distribution (MPD) type sensors.

3. The system of claim 1, wherein said plurality of first sensors are fiber bragg gratings (FBG) type sensors.

4. The system of claim 1, wherein said sensors are multimode optical fibers.

5. The system of claim 4, wherein said fiber optic network includes a plurality of light emitting diodes positioned at one end of each fibers and a photodiode array positioned to receive light from each of said fibers.

6. The system of claim 1, wherein said transmitter acquires said output as data, processes and RF modulates the signal to enhance the signal to noise ratio and prepares it for wireless transmission.

7. The system of claim 1, wherein said transmitter is a wireless RF transmitter.

8. The system of claim 7, wherein the signal is recorded before modulation.

9. The system of claim 7, wherein the signal is read-out before modulation.

10. The system of claim 1, wherein said receiving station demodulates said received signal enhances the output signal before read-out or recording.

11. A system for evaluating parachutes under load, comprising:
    a parachute including a canopy, a plurality of suspension lines attached thereto at one end and a load attached to said suspension lines at the other end therof;
    a plurality of first sensor means attached to said canopy and said suspension lines for measuring localized axial strain and stress measurements;
    a plurality of second sensor means attached to said canopy and said suspension lines for transverse stress measurements and as integration of axial stress/strain measurements for large areas;
    fiber optic network means for interconnecting said pluralities of first and second sensor means to provide sensor outputs;
    transmitter means for receiving said sensor outputs, converting said outputs to electronic signals, modulating said electronic signals and transmitting said modulated electronic signals; and
    receiving station means for receiving and processing said transmitted modulated electronic signals.

12. The system of claim 11, wherein said plurality of first sensor means are fiber bragg gratings (FBG) type sensor means.

13. The system of claim 11, wherein said plurality of second sensor means are modal power distribution (MPD) type sensor means.

14. The system of claim 11, wherein said sensor means are multimode optical fibers.

15. The system of claim 14, wherein said fiber optic network means includes a plurality of light emitting diode means positioned at one end of each fibers and a photodiode array positioned to receive light from each of said fibers.

16. The system of claim 11, wherein said transmitter means acquires said output as data, processes and RF modulates the signal to enhance the signal to noise ratio and prepares it for wireless transmission.

17. The system of claim 11, wherein said transmitter means is a wireless RF transmitter means.

18. The system of claim 17, wherein the signal is recorded before modulation.

19. The system of claim 17, wherein the signal is recorded before modulation.

20. The system of claim 1, wherein said receiving station demodulation said received signal enhances the output signal before read-out or recording.

21. A method for evaluating parachutes under load, comprising the steps of:
    a parachute including a canopy, a plurality of suspension lines attached thereto at one end and a load attached to said suspension lines at the other end therof,
    attaching a plurality of first sensors to a parachute canopy and suspension lines for measuring localized axial strain and stress measurements;
    attaching a plurality of second sensors to said parachute canopy and suspension lines for transverse stress measurements and as integration of axial stress/strain measurements for large areas;
    interconnecting said first and second sensors to a fiber optic network to provide sensor outputs;

converting said outputs to electronic signals, modulating said electronic signals and transmitting said modulated electronic signals; and receiving and processing said transmitted modulated electronic signals.

22. The method of claim 21, wherein said plurality of first sensors are fiber bragg gratings (FBG) type sensors.

23. The method of claim 21, wherein said plurality of second sensors are modal power distribution (MPD) type sensors.

24. The method of claim 21, wherein said sensors are multimode optical fibers.

25. The method of claim 24, wherein said fiber optic network includes a plurality of light emitting diodes positioned at one end of each fibers and a photodiode array positioned to receive light from each of said fibers.

26. The method of claim 21, wherein said transmitter acquires said output as data, processes and RF modulates the signal to enhance the signal to noise ratio and prepares it for wireless transmission.

27. The method of claim 21, wherein said transmitter is a wireless RF transmitter.

28. The method of claim 27, wherein the signal is recorded before modulation.

29. The method of claim 27, wherein the signal is read-out before modulation.

30. The method of claim 21, wherein said receiving station demodulates said received signal enhances the output signal before read-out or recording.

31. A system for evaluating flexible structures under strain, comprising:

a flexible structure having a load attached thereto;

a plurality of first sensors attached to said structure for measuring localized axial strain and stress measurements;

a plurality of second sensors attached to said structure for transverse stress measurements and as integration of axial stress/strain measurements for large areas;

a fiber optic network interconnecting said pluralities of first and second sensors to provide sensor outputs;

a transmitter for receiving said sensor outputs, converting said outputs to electronic signals, modulating said electronic signals and transmitting said modulated electronic signals; and a receiving station for receiving and processing said transmitted modulated electronic signals.

32. The system of claim 31, wherein said plurality of first sensors are fiber bragg gratings (FBG) type sensors.

33. The system of claim 31, wherein said plurality of second sensors are modal power distribution (MPD) type sensors.

34. The system of claim 31, wherein said sensors are multimode optical fibers.

35. The system of claim 34, wherein said fiber optic network includes a plurality of light emitting diodes positioned at one end of each fibers and a photodiode array positioned to receive light from each of said fibers.

36. The system of claim 31, wherein said transmitter acquires said output as data, processes and RF modulates the signal to enhance the signal to noise ratio and prepares it for wireless transmission, and said transmitter is a wireless RF transmitter.

* * * * *